United States Patent
Mary et al.

(10) Patent No.: US 10,320,142 B2
(45) Date of Patent: Jun. 11, 2019

(54) DEVICE FOR GENERATING A LASER RADIATION AND ASSOCIATED FABRICATION METHOD

(71) Applicant: THALES, Courbevoie (FR)

(72) Inventors: Alexandre Charles Lucien Mary, Chatellerault (FR); Dominique Pascal Marius Foucret, Chatellerault (FR)

(73) Assignee: THALES, Courbevoie (FR)

( * ) Notice: Subject to any disclaimer, the term of this patent is extended or adjusted under 35 U.S.C. 154(b) by 164 days.

(21) Appl. No.: 15/633,903

(22) Filed: Jun. 27, 2017

(65) Prior Publication Data
US 2017/0373456 A1    Dec. 28, 2017

(30) Foreign Application Priority Data

Jun. 28, 2016    (FR) ..................... 16 01019

(51) Int. Cl.
| | |
|---|---|
| *H01S 3/038* | (2006.01) |
| *H01S 3/083* | (2006.01) |
| *G01C 19/66* | (2006.01) |
| *H01S 3/03* | (2006.01) |
| *H01S 3/22* | (2006.01) |

(52) U.S. Cl.
CPC ............ *H01S 3/038* (2013.01); *G01C 19/661* (2013.01); *H01S 3/0388* (2013.01); *H01S 3/0835* (2013.01); *H01S 3/03* (2013.01); *H01S 3/0385* (2013.01); *H01S 3/2222* (2013.01)

(58) Field of Classification Search
CPC .................................................... H01S 3/0835
See application file for complete search history.

(56) References Cited

U.S. PATENT DOCUMENTS

| | | |
|---|---|---|
| 4,595,377 A | 6/1986 | Norvell |
| 2009/0261276 A1 | 10/2009 | Lubomirsky et al. |
| 2015/0132599 A1 | 5/2015 | Mary et al. |

FOREIGN PATENT DOCUMENTS

| | | |
|---|---|---|
| EP | 0 323 358 A1 | 7/1989 |
| EP | 2 876 749 A2 | 5/2015 |
| WO | 03/023325 A1 | 3/2003 |

OTHER PUBLICATIONS

French Search Report, dated Mar. 10, 2017, from corresponding FR application No. 10 01019.

*Primary Examiner* — Tod T Van Roy
(74) *Attorney, Agent, or Firm* — Young & Thompson

(57) ABSTRACT

Disclosed is a device for generating a laser radiation including a box and an electrode, the electrode including a column extending along an axial direction and a collar surrounding the column and having a first face perpendicular to the axial direction and a second face parallel to the first face, the second face facing the box. The generating device includes a ring having a third face bearing against the box, the ring defining a hole emerging on the third face and accommodating the collar, the hole being defined along the axial direction by a bearing face arranged in the ring, perpendicular to the axial direction and facing the box, the first face bearing against the bearing face.

9 Claims, 4 Drawing Sheets

DEVICE FOR GENERATING A LASER RADIATION AND ASSOCIATED FABRICATION METHOD

BACKGROUND OF THE INVENTION

The present invention relates to a device for generating a laser radiation and an associated fabrication method.

Many types of devices provided for generating a laser radiation include a box in which a gas having a population inversion is confined. Such a population inversion, in which a first "high" energy state is more populated than a second, lower energy state, is necessary for the stimulated emission to become the dominant radiation for a laser radiation to be emitted.

In order to obtain such a population inversion, it is necessary for the gas contained in the box to be stimulated by an outside energy source. In particular, a plasma is frequently maintained in the box through the application of a difference in potential between two electrodes of the box. Each electrode then covers a hole of the box and must therefore ensure both the electricity transfer and the sealing between the inside and the outside of the box.

The box is frequently made from glass or vitroceramic, which imposes significant constraints on it regarding the methods used to fasten the electrode to the box. In particular, an indium alloy is frequently used to stick the electrode to the box. However, such an alloy is sensitive to corrosion and must be isolated from the outside by a sealing gasket. Yet the stresses, in particular shear stresses, tend to deteriorate the seal, and therefore the alloy, during the lifetime of the device. This results in a loss of sealing and the contamination or loss of the inside gas.

During the laser emission, the generating device reaches high temperatures of up to 120 degrees Celsius (° C.). Thus, the generating device is subject to large-amplitude thermal variations between the usage periods and the idle periods.

Furthermore, it is difficult to separate two parts adhered with such an indium alloy, which makes the device difficult to maintain. A device is known from document WO03/023325 A1 for generating a laser radiation in which a glass ring is inserted between the electrode and the box. The ring is fastened by molecular adhesion to the box and with an indium alloy to the electrode. However, such a ring increases the total height of the relief formed by the electrode, which increases the bulk of the device and makes the latter even more sensitive to shear stresses.

Furthermore, connections by molecular adhesion and with an indium alloy are difficult to produce and highly sensitive to any damage of the affected surfaces. Yet the aforementioned device does not allow easy monitoring of the state of the surfaces involved in the connection between the ring and the box or the electrode. Here again, this results in a risk of deterioration of the device.

SUMMARY OF THE INVENTION

The aim of the invention is to propose a device for generating a laser radiation that is more reliable.

To that end, the invention relates to a device for generating a laser radiation including a box and an electrode, the electrode including a column extending along an axial direction and a collar at least partially surrounding the column in a plane perpendicular to the axial direction, the collar having a first face perpendicular to the axial direction and a second face parallel to the first face, the second face facing the box. The generating device further includes a ring for fastening the electrode to the box, the ring having a third face bearing against the box and a fourth face parallel to the third face, the ring defining a first hole and a second hole coaxial to one another, each hole extending along the axial direction, the first hole emerging on the fourth face and at least partially accommodating the column, the second hole emerging on the third face and accommodating the collar. A transverse dimension measured along a direction perpendicular to the axial direction is defined for each hole, the transverse dimension of the first hole being strictly smaller than the transverse dimension of the second hole, the second hole being defined along the axial direction by a bearing face arranged in the ring, the bearing face being perpendicular to the axial direction and facing the box, the first face of the collar bearing against the bearing face of the ring.

Such a device for generating a laser radiation is less sensitive to any shearing effects applied on the electrode, and the risks of deterioration of the connections between the ring and the electrode are therefore reduced. The device is therefore more reliable.

The generating device further comprises one or more of the following features, considered alone or according to any technically possible combination(s):

- the column, the collar, the first hole and the second hole are cylindrical with a circular base around a main axis parallel to the axial direction, the main axis being shared by the column, the collar, the first hole and the second hole;
- the ring has an inner side face defining the first hole in a plane perpendicular to the axial direction, a play between the column and the inner side face being greater than or equal to 10 micrometers;
- a hydrophobic material is inserted between the column and the inner side face;
- the ring is made from a material transparent to the visible radiation;
- the first face of the collar is fastened to the bearing face of the ring by an adhesive material;
- the third face is fastened to the box by molecular bonding;
- the generating device is a laser gyrometer.

The invention also relates to a fabrication method for at least one device for generating a laser radiation including a box, the method comprising the following steps:

- providing at least one electrode including a column extending along a first axis and a collar at least partially surrounding the column in a plane perpendicular to the first axis, the collar having a first face perpendicular to the first axis and a second face parallel to the first face,
- providing a support having at least one opening, each opening extending along a secondary axis,
- providing, for each electrode, a ring for fastening the electrode to the box, the ring having a third face and a fourth face parallel to the third face, the ring defining a first hole and a second hole coaxial to one another, each hole extending along a main axis, the first hole emerging on the fourth face and the second hole emerging on the third face, the second hole being defined along a direction parallel to the main axis by a bearing face arranged in the ring, the bearing face being perpendicular to the main axis,
- causing the fourth face of each ring to bear against a support such that each main axis is combined with the secondary axis of a corresponding opening,
- depositing an adhesive material on the bearing face of each ring,
- positioning each electrode in an inserted position in which the column is at least partially accommodated in an opening of the support and in the first hole of the corresponding ring, the collar being accommodated in the second hole of said ring, the first face of the collar facing the bearing face of the ring, and applying a force on the third face of each electrode tending to press the first face of the collar against the bearing face of the corresponding ring.

Optionally, a plurality of electrodes are provided during the step for providing at least one electrode, an assembly being defined for each electrode at the end of the application step, each assembly comprising an electrode and the corresponding ring, the method further comprising a step for simultaneous fastening to the box of each assembly, the third face of each ring bearing against the box when the assembly comprising the ring is fastened to the box.

BRIEF DESCRIPTION OF THE DRAWINGS

The features and advantages of the invention will appear upon reading the following description, provided solely as a non-limiting example, and done in reference to the appended drawings, in which.

DETAILED DESCRIPTION OF PREFERRED EMBODIMENTS

Figure 1:
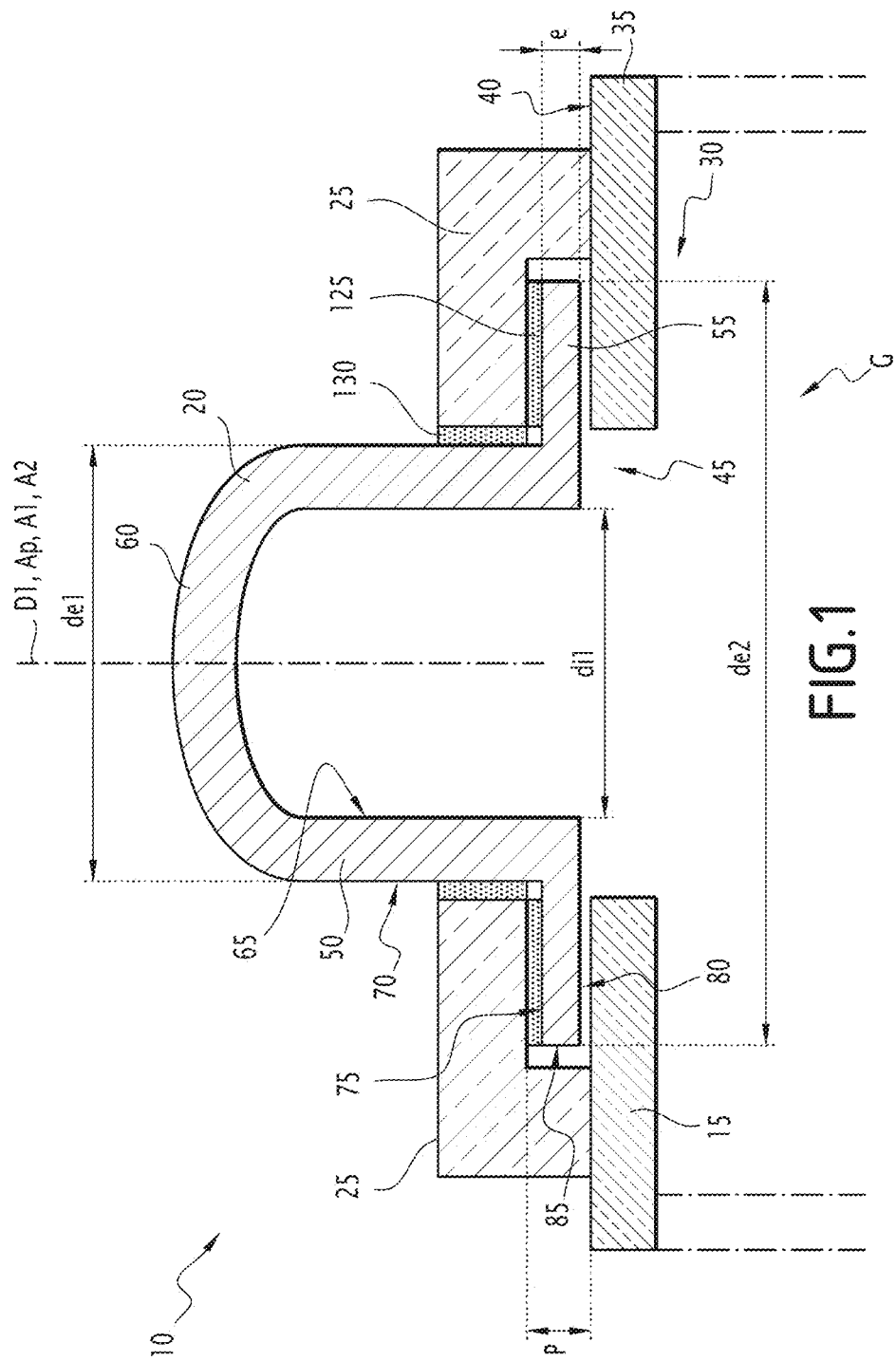
FIG. 1 is a partial sectional view of one embodiment of a device for generating a laser radiation including a box, an electrode and a ring fastening the electrode to the box.

FIG. 1 provides a partial sectional view of one embodiment of a device 10 for generating a laser radiation.

The device 10 is able to emit a laser radiation such as a monochromatic radiation.

The device 10 contains a gas G and is configured to emit the radiation when the gas G is excited by an electricity source. For example, the device 10 is configured to emit the radiation when a difference in electric potential is applied to two electrodes in contact with the gas G. In particular, the device 10 is configured to emit the radiation when a plasma is generated in the gas G by application of the difference in electric potential.

The device 10 is a laser gyrometer. A laser gyrometer is a device able to measure an angular speed along at least one plane using the Sagnac effect.

The gas G is for example a Helium-Neon mixture.

The device 10 comprises a box 15, at least one electrode 20 and a ring 25.

The box 15 defines a chamber 30 able to contain the gas G.

The box 15 is configured to prevent the exchange of material between the chamber 30 and the outside of the box 15 when the electrode 20 and the ring 25 are fastened to the box 15.

The box 15 is made from an electrically insulating material. For example, the box 15 is made from glass or vitroceramic. In particular, the box 10 is made from glass having a low thermal expansion coefficient, such as Zerodur®.

The box 15 includes at least one wall 35.

In particular, the box 15 includes a plurality of walls 35, only one of which has been shown in FIG. 1. The other walls 35, not shown, have been indicated by broken lines in FIG. 1.

The walls 35 of the box 15 define the chamber 30 and separate the chamber 30 from the outside of the box 15.

The box 15 is for example a prismatic box, or a parallelepiped box.

The wall 35 has an outer face 40 and defines a first opening 45.

The outer face 40 is planar. The outer face is perpendicular to a direction called axial direction D1.

The first opening 45 is open on the outer face 40.

The first opening 45 traverses the wall from the chamber 30 to the outside of the box 15. The first opening 45 is configured to allow contact between the gas G contained in the chamber 30 and the electrode 20.

The first opening 45 extends along the axial direction D1. For example, the first opening 45 is cylindrical with a circular base.

The term "cylinder" means that the first opening 45 is defined by two planes parallel to one another and by a surface delimited by all of the straight lines parallel to a straight line called generatrix of the cylinder and intersecting a closed curve, called guide curve of the cylinder. When the parallel planes are perpendicular to the generatrix, the cylinder is said to be "straight".

A first axis A1 is defined for the first opening 45. "Axis of a cylinder" refers to a straight line parallel to the generatrix and traversing the center of the guide curve. The first axis A1 is parallel to the axial direction D1.

The guide curve is circular. Such a cylinder is then called "cylindrical with a circular base around the first axis A1".

The two planes defining the first opening 45 are perpendicular to the axial direction D1.

The electrode 20 is provided to electrically connect the gas G contained in the chamber 30 and the outside of the box 15.

The electrode 20 is made from an electrically conductive material, such as a metal material. For example, the electrode 20 is made from aluminum.

The electrode 20 comprises a column 50, a collar 55 and an end wall 60.

The column 50 extends along a main axis Ap.

The column 50 is cylindrical with an annular base. In particular, the column 50 is defined by two coaxial cylinders. The axis of the two cylinders defining the column 50 is called main axis Ap.

In particular, the two cylinders defining the column 50 have a circular base. In other words, the column 50 is cylindrical with a circular base and is traversed by a cylindrical hole with a circular base coaxial to the column.

Alternatively, both cylinders have a polygonal base, for example a square base.

The column 50 has an inner face 65 and an outer face 70. The column 50 is defined, in a plane perpendicular to the main axis Ap, by the inner face 65 and the outer face 70.

Each of the inner face 65 and the outer face 70 is cylindrical with a circular base around the main axis Ap.

When the column 50 is cylindrical with a circular base, the column 50 has a first inner diameter di1 and a first outer diameter de1.

The first inner diameter di1 is measured between two points of the inner face 65 that are connected by a segment perpendicular to the main axis Ap and traversing the main axis Ap. The first inner diameter di1 is comprised between 10 millimeters (mm) and 40 mm.

The first outer diameter de1 is measured between two points of the outer face 70 that are connected by a segment perpendicular to the main axis Ap and traversing the main axis Ap. The first outer diameter de1 is comprised between 10 mm and 40 mm.

When the column 50 has a square base, the column 50 has an outer side length. The outer side length is the length of one side of the outer face 70. The outer side length is comprised between 10 mm and 40 mm.

The collar 55 is cylindrical with an annular base around the main axis Ap.

The electrode 20 is defined along the main axis Ap by the collar 55 and by the end wall 60.

The collar 55 has a first face 75, a second face 80 and a peripheral face 85.

The first face 75 is perpendicular to the main axis Ap. The first face 75 is planar.

The second face 80 is parallel to the first face 75. The second face 80 is preferably planar.

Among the first face 75 and the second face 80, the first face 75 is closest to the end wall 60. Thus, the first face 75 defines the outer face 70 along a direction parallel to the main axis Ap.

The peripheral face 85 defines the collar in a plane perpendicular to the main axis Ap. The peripheral face 85 surrounds the collar in a plane at the main axis Ap.

When the column 50 is cylindrical with a circular base, the peripheral face 85 is cylindrical with a circular base around the main axis Ap.

Alternatively, when the column 50 is cylindrical with a square base, the peripheral face 85 is cylindrical with a square base around the main axis Ap.

The collar 55 has a second outer diameter de2. The second outer diameter de2 is the diameter of the peripheral face 85. The second outer diameter de2 is strictly larger than the diameter of the first opening 45. The second outer diameter de2 is comprised between 1 centimeter (cm) and 3 cm.

The collar 55 has a thickness e greater than or equal to 2 mm. The thickness e of the collar 55 is measured, along a direction parallel to the main axis Ap, between the first face 75 and the second face 80.

Figure 2:
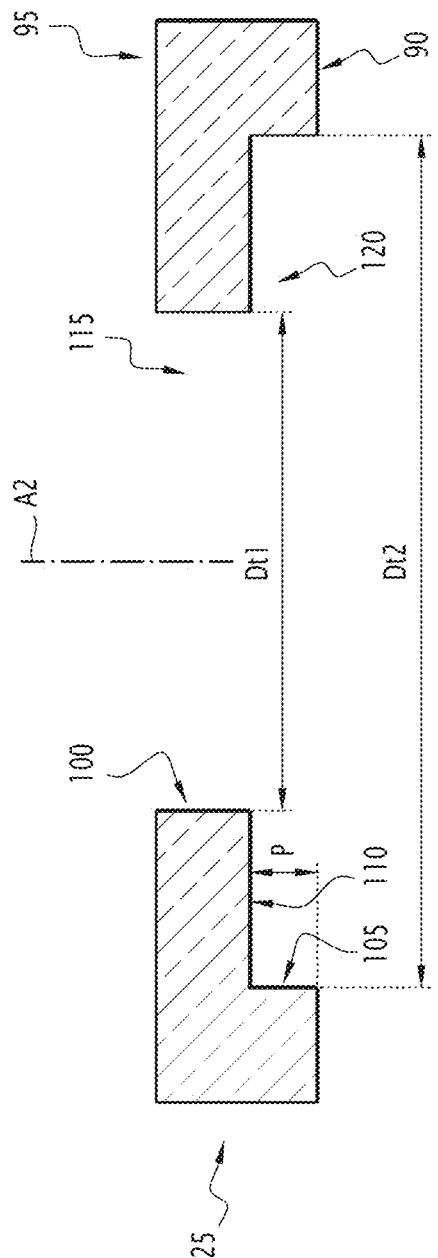
FIG. 2 is a sectional view of the ring of FIG. 1.

An example ring 25 has been shown in FIG. 2.

The ring 25 is configured to fasten the electrode 20 to the box 15 in a fastening position.

The ring 25 is made from a material transparent to the visible radiation. For example, the ring 25 is made from glass. Alternatively, the ring 25 is made from vitroceramic.

The visible radiation is the set of electromagnetic waves having a wavelength in a vacuum comprised between 400 nanometers (nm) and 800 nm.

The ring 25 is cylindrical with a circular base around a second axis A2. Alternatively, the ring 25 is a parallelepiped.

The ring 25 has a third outer diameter measured in a plane perpendicular to the second axis A2. The third outer diameter is larger than or equal to the second outer diameter de2 increased by 4 millimeters.

The ring 25 has a third face 90, a fourth face 95, a first inner side face 100, a second inner side face 105 and a bearing face 110.

The ring 25 defines a first hole 115 and a second hole 120.

The third face 90 is perpendicular to the second axis A2. The third face 90 is planar.

The third face 90 is provided to be fastened to the outer face 40 of the box by molecular bonding. In particular, the third face 90 is polished.

The fourth face 95 is parallel to the third face 90. The fourth face 95 is perpendicular to the second axis A2. The fourth face 95 is preferably planar.

The fourth face 95 is provided to allow a viewer to observe the third face 90 and the bearing face 110 through the fourth face 95. In particular, the fourth face 95 is polished.

The first inner side face 100 defines the first hole 115 in a plane perpendicular to the second axis A2. The first inner side face 100 is defined in a direction parallel to the first axis A2 by the fourth face 95 and by the second hole 120.

The first inner side face 100 is cylindrical around the second axis A2.

The second inner side face 105 defines the second hole 120 in a plane perpendicular to the second axis A2. The second inner side face 105 is defined in a direction parallel to the first axis A2 by the third face 90 and by the bearing face 110.

The second inner side face 105 is cylindrical around the second axis A2.

The bearing face 110 is annular around the second axis A2. For example, the bearing face 110 is annular with a circular base. Alternatively, the bearing face 110 is annular with a polygonal base, for example a square base.

The bearing face 110 is planar. The bearing face 110 is perpendicular to the second axis A2.

The bearing face 110 defines the second hole 120 along a direction parallel to the second axis A2.

The bearing face 110 is opposite the fourth face 95. In particular, at least one portion of the ring 110 is defined along a direction parallel to the second axis A2 by the fourth face 95 and by the bearing face 110.

The bearing face 110 is rough. For example, the bearing face 110 is not polished after machining.

The first hole 115 is configured to accommodate the column 50 when the ring 25 fastens the electrode 20 in the fastening position.

The first hole 115 extends along the second axis A2. For example, the first hole 115 is cylindrical around the second axis A2. The first hole 115 is preferably a straight cylinder.

When the column 50 is cylindrical with a circular base, the first hole 115 is cylindrical with a circular base.

Alternatively, the first hole 115 is cylindrical with a polygonal base. For example, when the column 50 is cylindrical with a square base, the first hole 115 is cylindrical with a square base, therefore parallelepiped.

The first hole 115 emerges on the fourth face 95.

The first hole 115 emerges on the bearing face 110.

A first transverse dimension Dt1 is defined for the first hole 115. The first transverse dimension Dt1 is measured along a direction perpendicular to the second axis A2.

When the first hole 115 is cylindrical with a circular base, the first transverse dimension Dt1 is a diameter of the first hole 115.

When the first hole 115 is cylindrical with a square base, the first transverse dimension Dt1 is a length of one side of the square.

The first transverse dimension Dt1 is strictly larger than the first outer diameter de1.

The first transverse dimension Dt1 is greater than or equal to the first inner diameter di1 and less than or equal to the second outer diameter de2 minus twice the thickness e.

The second hole 120 is configured to accommodate the collar 55 when the ring 25 fastens the electrode 20 in the fastening position.

The second hole 120 and the first hole 115 are coaxial to one another.

The second hole 120 extends along the second axis A2. For example, the second hole 120 is cylindrical around the second axis A2. The second hole 120 is preferably a straight cylinder.

The second hole 120 is for example cylindrical with a circular base when the peripheral face 85 is cylindrical with a circular base.

Alternatively, the second hole 120 is cylindrical with a polygonal base. For example, the second hole 120 is for example cylindrical with a square base, therefore parallelepiped, when the peripheral face 85 is parallelepiped.

The second hole 120 emerges on the third face 90.

The second hole 120 is defined, in a plane perpendicular to the second axis A2, by the bearing face 110.

A second transverse dimension Dt2 is defined for the second hole 120. The second transverse dimension Dt2 is measured along a direction perpendicular to the second axis A2.

When the second hole 120 is cylindrical with a circular base, the second transverse dimension Dt2 is a diameter of the second hole 120.

When the second hole 120 is cylindrical with a square base, the second transverse dimension Dt2 is a length of one side of the square.

The second transverse dimension Dt2 is strictly greater than the first transverse dimension Dt1. The second transverse dimension Dt2 is strictly greater than the second outer diameter de2.

The second hole 120 has a depth P. The depth p is measured along a direction parallel to the second axis A2 between a point of the third face 90 and a point of the bearing face 110.

The depth p is strictly greater than the thickness e of the collar 55. For example, a difference between the depth p and the thickness e of the collar 55 is greater than or equal to 50 µm, preferably greater than or equal to 100 µm. The depth p is further less than or equal to 200 µm.

When the electrode 20 is kept in the fastening position by the ring 25, the first axis A1, the second axis A2 and the main axis Ap are combined. The first axis A1, the second axis A2 and the main axis Ap are then all parallel to the axial direction D1.

When the electrode 20 is kept in the fastening position by the ring 25, the third face 90 bears against the outer face 40 of the box 15. The bearing face 110 then faces the box 15.

Preferably, the third face 90 is fastened to the outer face 40 of the box 15 by molecular bonding. Molecular bonding is a technique for fastening parts to one another in which two very smooth surfaces free of contamination adhere to one another going to Van der Waals forces.

When the electrode 20 is kept in the fastening position by the ring 25, the first face 75 of the collar 55 bears against the bearing face 110 of the ring 25. Preferably, the first face 75 is fastened to the bearing face 110 by an adhesive material 125 received between the first face 75 and the bearing face 110.

The adhesive material 125 is for example an indium alloy.

The adhesive material 125 has a thickness comprised between 50 micrometers (µm) and 150 µm.

When the electrode 20 is kept in the fastening position by the ring 25, a distance, measured along the axial direction D1, between the second face 80 and the outer face 40, is less than or equal to 100 µm.

Preferably, when the electrode 20 is kept in the fastening position by the ring 25, a mechanical play between the column 55 and the first inner side face 100 is greater than or equal to 10 µm. For example, the play is greater than or equal to 100 µm.

A seal 130 is inserted between the outer face 70 of the column 50 and the first inner side face 100. The seal 130 is configured to isolate the adhesive material 125 from the outside atmosphere. In particular, the seal 130 is configured to protect the adhesive material 125 from corrosion.

The seal 130 is made from a hydrophobic material. For example, the seal 130 is made from a resin, such as an epoxy resin. Alternatively, the seal 130 is made from a silicone glue. According to another alternative, the seal 130 is made from a silicone varnish.

A fabrication method of the device 10 will now be described, in one embodiment suitable for the fabrication of a plurality of devices 10.

Figure 4:
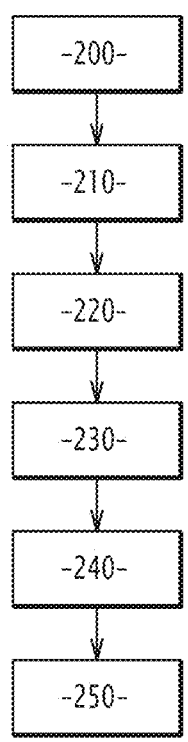
FIG. 4 is a flowchart of the steps of a fabrication method for the generating device of FIG. 1.

FIG. 4 shows a flowchart of the steps of the fabrication method.

During a supply step 200, at least one electrode 20 is supplied. For example, a plurality of electrodes 20 is supplied. A ring 25 is also supplied for each electrode 20.

Furthermore, a support 135 is also supplied.

The support 135 is for example a plate.

The support 135 is made from a rigid material, such as a metal material, for example steel. Alternatively, the support 135 is made from another material, ceramic, or glass.

The support 135 has a planar face 140.

The support 135 has at least one second opening 145. In particular, the support 135 has a second opening 145 for each electrode 20.

Each second opening 145 extends along a secondary axis As. Each secondary axis As is perpendicular to the planar face 140.

Each second opening 145 is cylindrical around the corresponding second axis As. For example, each second opening 145 is cylindrical with a circular base. Alternatively, each second opening 145 is cylindrical with a polygonal base, for example with a square base.

A third transverse dimension Dt3 is defined for each second opening 145. The first third transverse dimension Dt3 is measured along a direction perpendicular to the secondary axis As.

When the second opening 145 is cylindrical with a circular base, the third transverse dimension Dt3 is a diameter of the second opening 145.

When the second opening 145 is cylindrical with a square base, the third transverse dimension Dt3 is a length of one side of the square.

The third transverse dimension Dt3 is strictly larger than the first outer diameter de1. For example, the third transverse dimension Dt3 is equal to the first transverse dimension Dt1.

Each second opening 145 is configured to at least partially accommodate the column 50 of an electrode 20.

During a placement step 210, each ring 25 is placed bearing against the planar face 140 of the support 135. The main axis Ap of each ring 25 is then combined with the secondary axis As of the corresponding second opening 145.

During a deposition step 220, the adhesive material 125 is deposited on the bearing face 110. The deposition step 220 is for example done after the placement step. Alternatively, the adhesive material is deposited before the ring 25 is placed.

During a positioning step 230, each electrode 20 is placed in a respective inserted position. When the electrode 20 is in the inserted position, the column 50 is at least partially accommodated in the corresponding second opening 145 and in the first hole 115 of the ring 25. In particular, each column 50 successively traverses the first hole 115 and the second opening 145 along a direction parallel to the secondary axis As.

The collar 55 is then accommodated in the second hole 120. In particular, the collar 55 is surrounded by the second inner side face 105 in a plane perpendicular to the second axis A2.

When the electrode 20 is in the inserted position, the first face 75 of the collar 55 faces the bearing face 110.

Figure 3:
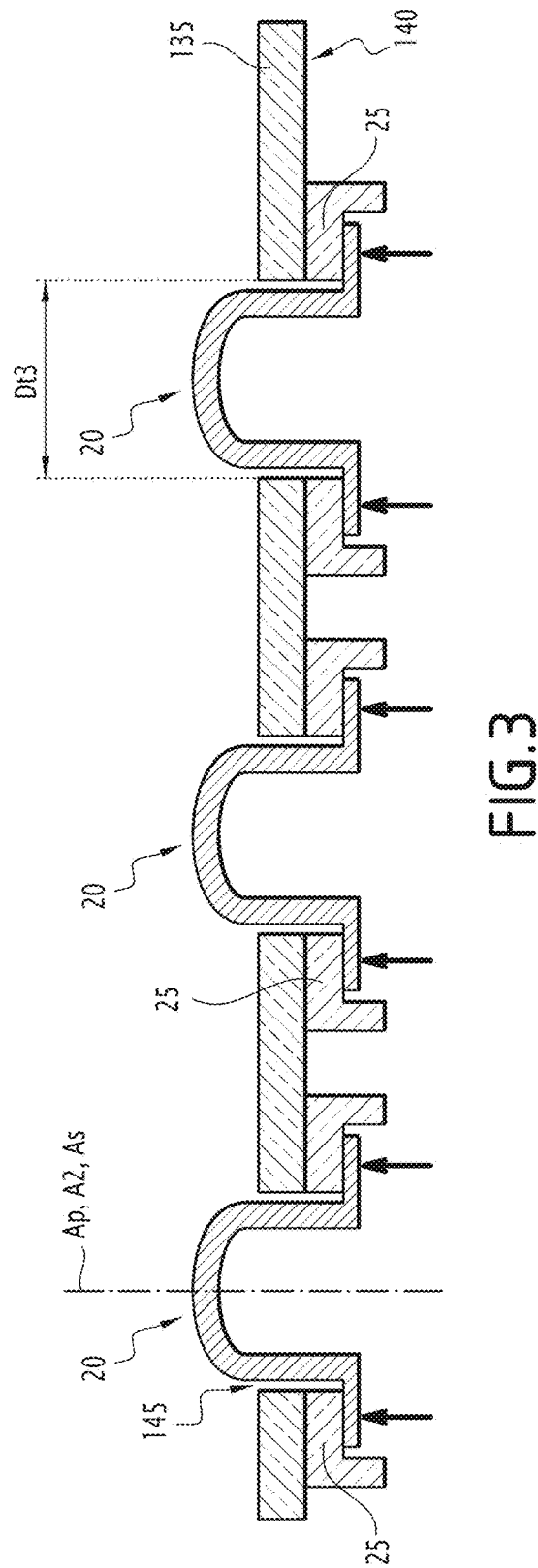
FIG. 3 is a sectional view of a plurality of assemblies each formed by a ring and an electrode, each assembly bearing against a support.

A single support 135, three rings 25 and three electrodes 20 have been shown in FIG. 3. In FIG. 3, each electrode 20 is in the inserted position, and each ring 25 is bearing against the planar face 140.

During an application step 240, a force having at least one component parallel to the main axis Ap is applied on the second face 80 of each collar 55. The forces have been shown by arrows in FIG. 3.

Each force is oriented toward the bearing face 110. In particular, each force tends to press the first face 75 of the collar 55 against the bearing face 110 of the corresponding ring 25.

At the end of the application step 240, a plurality of assemblies are then formed, each assembly comprising an electrode 20 and the ring 25 in which the electrode 20 is inserted.

During a fastening step 250, each assembly is fastened to the box 15 of at least one corresponding device 10. For example, each box 15 receives a single corresponding assembly.

Alternatively, at least one box 15 receives a plurality of assemblies. In other words, at least two assemblies are fastened to a same box 15.

During the fastening step 250, each ring 25 is fastened to the corresponding box 15. Each ring 25 then keeps the corresponding electrode 20 in its respective fastening position.

Preferably, during the fastening step 250, the assemblies are simultaneously fastened to the corresponding box or boxes 15. For example, all of the assemblies are simultaneously attached on the corresponding box or boxes owing to the support 135, then fastened to the corresponding box or boxes by molecular bonding.

Owing to the ring 25, the consequences of any shear forces applied on the electrode 20 are limited. In particular, the seal 130 is not very sensitive to these shear forces, and the risk of corrosion of the adhesive material 125 is limited. The device 10 is therefore more reliable.

Furthermore, owing to the ring 25, the height of the relief formed by the electrode 20 on the outer face 40 of the box 15 is reduced. The bulk of the device 10 is therefore reduced.

Furthermore, due to the use of molecular bonding, it is relatively easy to separate the ring 25 from the box 15. The maintenance of the device 10 and the replacement of a faulty electrode 20 or ring 25 are therefore made easier.

Furthermore, it is easy to observe the interfaces between the third face 90 and the outer face 40 of the box 15 and between the first face 75 of the collar and the bearing face 110 through the fourth face 95. These connecting interfaces can therefore be monitored by an operator, which facilitates the early detection of scratches or deterioration. A preventive intervention is then done easily, before the deterioration has caused permanent damage to the device 10.

The play between the outer face 70 and the first inner side face 100 prevents the temperature variations during the operation of the device 10 from causing the appearance of significant thermal stresses capable of damaging the ring 25 or the electrode 20, which further improves the reliability of the device 10.

By using the ring 25, it is easy to place several electrodes simultaneously on one or several boxes 15. Thus, the fabrication method is made faster than the methods of the state of the art. In particular, the fabrication method is easy to automate.

Furthermore, the fastening of the electrode 20 to the ring 25 has little risk of damaging the surfaces, which will be fastened to one another afterwards by molecular bonding. Here again, the reliability of the device 10 is improved.

The invention claimed is:

1. A generating device for generating a laser radiation comprising:
    a box, containing a gas configured to emit the radiation;
    an electrode including a column extending along an axial direction and a collar at least partially surrounding the column in a plane perpendicular to the axial direction, the collar having a first face perpendicular to the axial direction and a second face parallel to the first face, the second face facing the box; and
    a ring configured to fasten the electrode to the box, the ring having a third face bearing against the box and a fourth face parallel to the third face, the ring defining a first hole and a second hole coaxial to one another, each hole extending along the axial direction, the first hole emerging on the fourth face and at least partially accommodating the column, the second hole emerging on the third face and accommodating the collar,
    wherein a transverse dimension measured along a direction perpendicular to the axial direction is defined for each hole, the transverse dimension of the first hole being strictly smaller than the transverse dimension of the second hole, the second hole being defined along the axial direction by a bearing face arranged in the ring, the bearing face being perpendicular to the axial direction and facing the box, the first face of the collar bearing against the bearing face of the ring, and
    the third face is fastened to the box by molecular bonding.

2. The generating device according to claim 1, wherein the column, the collar, the first hole and the second hole are cylindrical with a circular base around a main axis parallel to the axial direction, the main axis being shared by the column, the collar, the first hole and the second hole.

3. The generating device according to claim 1, wherein the ring has an inner side face defining the first hole in a plane perpendicular to the axial direction, a play between the column and the inner side face being greater than or equal to 10 micrometers.

4. The generating device according to claim 3, wherein a hydrophobic material is inserted between the column and the inner side face.

5. The generating device according to claim 1, wherein the ring is made from a material transparent to visible radiation.

6. The generating device according to claim 1, wherein the first face of the collar is fastened to the bearing face of the ring by an adhesive material.

7. The device according to claim 1, wherein the generating device is a laser gyrometer.

8. A fabrication method for at least one device for generating a laser radiation including a box which contains a gas configured to emit the radiation, the method comprising:
    providing at least one electrode including a column extending along a first axis and a collar at least partially surrounding the column in a plane perpendicular to the first axis, the collar having a first face perpendicular to the first axis and a second face parallel to the first face;

providing a support having at least one opening, each opening extending along a secondary axis;

providing, for each electrode, a ring for fastening the electrode to the box, the ring having a third face and a fourth face parallel to the third face, the ring defining a first hole and a second hole coaxial to one another, each hole extending along a main axis, the first hole emerging on the fourth face and the second hole emerging on the third face, the second hole being defined along a direction parallel to the main axis by a bearing face arranged in the ring, the bearing face being perpendicular to the main axis;

causing the fourth face of each ring to bear against the support such that each main axis is combined with the secondary axis of a corresponding opening;

depositing an adhesive material on the bearing face of each ring;

positioning each electrode in an inserted position in which the column is at least partially accommodated in an opening of the support and in the first hole of the corresponding ring, the collar being accommodated in the second hole of said ring, the first face of the collar facing the bearing face of the ring; and applying a force on the third face of each electrode tending to press the first face of the collar against the bearing face of the corresponding ring.

9. The method according to claim 8, wherein a plurality of electrodes are provided during the providing said at least one electrode, an assembly being defined for each electrode at the end of the applying, each assembly comprising an electrode and the corresponding ring, the method further comprising simultaneously fastening each assembly to the box, the third face of each ring bearing against the box when the assembly comprising the ring is fastened to the box.

* * * * *